US010613722B1

(12) United States Patent
Philipson

(10) Patent No.: US 10,613,722 B1
(45) Date of Patent: Apr. 7, 2020

(54) DISTORTING A GRAPH ON A COMPUTER DISPLAY TO IMPROVE THE COMPUTER'S ABILITY TO DISPLAY THE GRAPH TO, AND INTERACT WITH, A USER

(71) Applicant: Palantir Technologies, Inc., Palo Alto, CA (US)

(72) Inventor: David Philipson, Palo Alto, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 403 days.

(21) Appl. No.: 14/983,205

(22) Filed: Dec. 29, 2015

Related U.S. Application Data

(60) Provisional application No. 62/246,769, filed on Oct. 27, 2015.

(51) Int. Cl.
*G06F 3/0484* (2013.01)
*G06T 11/20* (2006.01)
*G06T 11/60* (2006.01)
*G06T 3/00* (2006.01)
*G06F 3/0488* (2013.01)
*G06F 3/0482* (2013.01)

(52) U.S. Cl.
CPC ........ *G06F 3/04845* (2013.01); *G06F 3/0482* (2013.01); *G06F 3/04842* (2013.01); *G06F 3/04883* (2013.01); *G06T 3/00* (2013.01); *G06T 11/206* (2013.01); *G06T 11/60* (2013.01)

(58) Field of Classification Search
None
See application file for complete search history.

(56) References Cited

U.S. PATENT DOCUMENTS 5,339,390 A * 8/1994 Robertson ............. G06T 3/0018
715/782
5,632,009 A    5/1997 Rao et al.
6,456,997 B1   9/2002 Shukla
6,594,672 B1   7/2003 Lampson et al.
6,980,984 B1   12/2005 Huffman et al.
(Continued)

FOREIGN PATENT DOCUMENTS

AU    2014250678    2/2016
EP     1672527      6/2006
(Continued)

OTHER PUBLICATIONS

Frank van Ham, Jarke J. van Wijk, "Interactive Visualization of Small World Graphs", 2004, IEEE (Year: 2004).*
(Continued)

*Primary Examiner* — YuJang Tswei
(74) *Attorney, Agent, or Firm* — Hickman Palermo Becker Bingham LLP

(57) ABSTRACT

Techniques are discussed herein for distorting nodes in a graph based on a window on a display, rendering a graphical representation of the distorted graph, and presenting the graphical representation in window. Distorting the location assigned to each node in the graph based on the window allows a computer to (1) present one or more nodes in a particular area of interest to a user in a way that is easier for the user to select or interact with the one or more nodes, and (2) visualize more of the graph than a simple zoomed-in view. Additional effects and benefits are discussed further herein.

26 Claims, 6 Drawing Sheets

(56) References Cited

U.S. PATENT DOCUMENTS

| | | | |
|---|---|---|---|
| 7,451,397 B2 | 11/2008 | Weber et al. | |
| 7,941,321 B2 | 5/2011 | Greenstein et al. | |
| 7,971,150 B2 | 6/2011 | Raskutti et al. | |
| 8,196,184 B2 | 6/2012 | Amirov et al. | |
| 8,290,926 B2 | 10/2012 | Ozzie et al. | |
| 8,554,709 B2 | 10/2013 | Goodson et al. | |
| 8,595,234 B2 | 11/2013 | Siripurapu et al. | |
| 8,639,757 B1 | 3/2014 | Adams et al. | |
| 8,676,857 B1 | 3/2014 | Adams et al. | |
| 8,787,939 B2 | 7/2014 | Papakipos et al. | |
| 9,069,842 B2 | 6/2015 | Melby | |
| 9,116,975 B2 | 8/2015 | Shankar et al. | |
| 9,146,954 B1 | 9/2015 | Boe et al. | |
| 2002/0095658 A1 | 7/2002 | Shulman | |
| 2003/0229848 A1 | 12/2003 | Arend et al. | |
| 2004/0111410 A1 | 6/2004 | Burgoon et al. | |
| 2004/0163039 A1 | 8/2004 | Gorman | |
| 2004/0193600 A1 | 9/2004 | Kaasten et al. | |
| 2004/0205524 A1 | 10/2004 | Richter et al. | |
| 2005/0065811 A1 | 3/2005 | Chu et al. | |
| 2005/0134610 A1* | 6/2005 | Doyle | G06F 3/0481 345/647 |
| 2005/0154628 A1 | 7/2005 | Eckart et al. | |
| 2005/0154769 A1 | 7/2005 | Eckart et al. | |
| 2006/0074881 A1 | 4/2006 | Vembu et al. | |
| 2006/0184889 A1 | 8/2006 | Molander | |
| 2006/0209085 A1 | 9/2006 | Wong et al. | |
| 2006/0242040 A1 | 10/2006 | Rader | |
| 2007/0008318 A1* | 1/2007 | Matsumoto | G06T 15/08 345/424 |
| 2007/0150369 A1 | 6/2007 | Zivin | |
| 2007/0162859 A1* | 7/2007 | Yakowenko | G06F 3/0482 715/733 |
| 2007/0192265 A1 | 8/2007 | Chopin et al. | |
| 2007/0208736 A1 | 9/2007 | Tanigawa et al. | |
| 2008/0162616 A1 | 7/2008 | Worley et al. | |
| 2009/0055251 A1 | 2/2009 | Shah et al. | |
| 2010/0030722 A1 | 2/2010 | Goodson et al. | |
| 2010/0114887 A1 | 5/2010 | Conway et al. | |
| 2010/0228812 A1 | 9/2010 | Uomini | |
| 2011/0029526 A1 | 2/2011 | Knight et al. | |
| 2011/0078055 A1 | 3/2011 | Faribault et al. | |
| 2011/0131547 A1 | 6/2011 | Elaasar | |
| 2011/0173032 A1 | 7/2011 | Payne et al. | |
| 2011/0181598 A1 | 7/2011 | O'Neall et al. | |
| 2011/0219321 A1 | 9/2011 | Gonzalez et al. | |
| 2011/0258158 A1 | 10/2011 | Resende et al. | |
| 2011/0289407 A1 | 11/2011 | Naik et al. | |
| 2011/0289420 A1 | 11/2011 | Morioka et al. | |
| 2012/0004904 A1 | 1/2012 | Shin et al. | |
| 2012/0036013 A1 | 2/2012 | Neuhaus et al. | |
| 2012/0075324 A1 | 3/2012 | Cardno et al. | |
| 2012/0117082 A1 | 5/2012 | Koperda et al. | |
| 2012/0170847 A1 | 7/2012 | Tsukidate | |
| 2012/0197651 A1 | 8/2012 | Robinson et al. | |
| 2012/0203708 A1 | 8/2012 | Psota et al. | |
| 2012/0221553 A1 | 8/2012 | Wittmer et al. | |
| 2012/0245976 A1 | 9/2012 | Kumar et al. | |
| 2012/0296907 A1 | 11/2012 | Long et al. | |
| 2013/0006916 A1 | 1/2013 | McBride et al. | |
| 2013/0046635 A1 | 2/2013 | Grigg et al. | |
| 2013/0050217 A1 | 2/2013 | Armitage | |
| 2013/0073454 A1 | 3/2013 | Busch | |
| 2013/0110822 A1 | 5/2013 | Ikeda et al. | |
| 2013/0117011 A1 | 5/2013 | Ahmed et al. | |
| 2013/0151148 A1 | 6/2013 | Parundekar et al. | |
| 2013/0157234 A1 | 6/2013 | Gulli et al. | |
| 2013/0267207 A1 | 10/2013 | Hao et al. | |
| 2013/0311375 A1 | 11/2013 | Priebatsch | |
| 2013/0326425 A1* | 12/2013 | Forstall | G01C 21/3638 715/851 |
| 2014/0009585 A1* | 1/2014 | Campbell | G06T 5/002 348/47 |
| 2014/0067611 A1 | 3/2014 | Adachi et al. | |
| 2014/0095273 A1 | 4/2014 | Tang et al. | |
| 2014/0108068 A1 | 4/2014 | Williams | |
| 2014/0129261 A1 | 5/2014 | Bothwell et al. | |
| 2014/0156527 A1 | 6/2014 | Grigg et al. | |
| 2014/0285624 A1* | 9/2014 | Acquavella | G06T 19/20 348/46 |
| 2014/0310266 A1 | 10/2014 | Greenfield | |
| 2014/0316911 A1 | 10/2014 | Gross | |
| 2014/0362930 A1* | 12/2014 | Brockmann | H04N 19/103 375/240.26 |
| 2015/0019394 A1 | 1/2015 | Unser et al. | |
| 2015/0073929 A1 | 3/2015 | Psota et al. | |
| 2015/0134666 A1 | 5/2015 | Gattiker et al. | |
| 2015/0169709 A1 | 6/2015 | Kara et al. | |
| 2015/0169726 A1 | 6/2015 | Kara et al. | |
| 2015/0170077 A1 | 6/2015 | Kara et al. | |
| 2015/0324868 A1 | 11/2015 | Kaftan et al. | |
| 2015/0346954 A1* | 12/2015 | Parag | G06F 3/04842 715/763 |
| 2015/0347903 A1 | 12/2015 | Saxena et al. | |
| 2015/0378996 A1 | 12/2015 | Kesin et al. | |
| 2016/0004667 A1 | 1/2016 | Chakerian et al. | |
| 2016/0034545 A1 | 2/2016 | Shankar et al. | |
| 2016/0180501 A1* | 6/2016 | Mallet | G06T 3/0018 382/164 |

FOREIGN PATENT DOCUMENTS

| | | |
|---|---|---|
| EP | 2863326 | 4/2015 |
| EP | 2884439 | 6/2015 |
| EP | 2884440 | 6/2015 |
| WO | WO 2002/065353 | 8/2002 |

OTHER PUBLICATIONS

Jammer, Decreasing Layer Opacity with Distance from Camera _ Adobe Community—Jammer—2012 (Year: 2012).*

Bluttman et al., "Excel Formulas and Functions for Dummies," 2005, Wiley Publishing, Inc., pp. 280, 284-286.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

Keylines.com, "KeyLines Datasheet," Mar. 2014, <http://keylines.com/wp-content/uploads/2014/03/KeyLines-datasheet.pdf> downloaded May 12, 2014 in 2 pages.

Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.

Palmas et al., "An Edge-Bunding Layout for Interactive Parallel Coordinates" 2014 IEEE Pacific Visualization Symposium, pp. 57-64.

Wikipedia, "Federated Database System," Sep. 7, 2013, retrieved from the internet on Jan. 27, 2015 http://en.wikipedia.org/w/index.php?title=Federated_database_system&oldid=571954221.

Vose et al., "Help File for ModelRisk Version 5," 2007, Vose Software, pp. 349-353. [Uploaded in 2 Parts].

Official Communication for New Zealand Patent Application No. 622513 dated Apr. 3, 2014.

Official Communication for European Patent Application No. 14189344.6 dated Feb. 20, 2015.

Official Communication for European Patent Application No. 14197879.1 dated Apr. 28, 2015.

Official Communication for European Patent Application No. 14197895.7 dated Apr. 28, 2015.

(56) References Cited

OTHER PUBLICATIONS

Official Communication for European Patent Application No. 14197938.5 dated Apr. 28, 2015.
U.S. Appl. No. 14/504,103, filed Oct. 1, 2014, Notice of Allowance, dated May 18, 2015.
U.S. Appl. No. 14/326,738, filed Jul. 9, 2014, Notice of Allowance, dated Nov. 18, 2015.
U.S. Appl. No. 14/306,154, filed Jun. 16, 2014, First Action Interview Sep. 9, 2014.
U.S. Appl. No. 14/306,147, filed Jun. 16, 2014, First Action Interview, dated Sep. 9, 2014.
U.S. Appl. No. 14/306,138, filed Jun. 16, 2014, First Action Interview, dated Sep. 23, 2014.
U.S. Appl. No. 14/319,765, filed Jun. 30, 2014, First Action Interview Nov. 25, 2014.
U.S. Appl. No. 14/323,935, filed Jul. 30, 2014, First Action Interview, dated Nov. 28, 2014.
U.S. Appl. No. 14/326,738, filed Jul. 9, 2014, First Action Interview, dated Dec. 2, 2014.
U.S. Appl. No. 14/319,765, filed Jun. 30, 2014, First Action Interview, dated Feb. 4, 2015.
U.S. Appl. No. 15/504,103, filed Oct. 1, 2014, First Action Interview, dated Feb. 5, 2015.
U.S. Appl. No. 14/306,138, filed Jun. 16, 2014, Final Office Action, dated Feb. 18, 2015.
U.S. Appl. No. 14/306,147, filed Jun. 16, 2014, Final Office Action, dated Feb. 19, 2015.
U.S. Appl. No. 14/306,154, filed Jun. 16, 2014, Final Office Action, dated Mar. 11, 2015.
U.S. Appl. No. 14/504,103, filed Oct. 1, 2014, First Action Interview, dated Mar. 31, 2015.
U.S. Appl. No. 14/323,935, filed Jul. 30, 2014, First Action Interview, dated Mar. 31, 2015.
U.S. Appl. No. 14/326,738, filed Jul. 9, 2014, First Action Interview, dated Mar. 31, 2015.
U.S. Appl. No. 14/306,154, filed Jun. 16, 2014, Advisory Action, dated May 15, 2015.
U.S. Appl. No. 14/306,138, filed Jun. 16, 2014, Office Action, dated May 26, 2015.
U.S. Appl. No. 14/319,765, filed Jun. 30, 2014, Final Office Action, dated Jun. 16, 2015.
U.S. Appl. No. 14/323,935, filed Jul. 30, 2014, Office Action, dated Jun. 22, 2015.
U.S. Appl. No. 12/556,318, filed Jun. 16, 2014, Office Action, dated Jul. 2, 2015.
U.S. Appl. No. 14/306,154, filed Jun. 16, 2014, Office Action, dated Jul. 6, 2015.
U.S. Appl. No. 14/306,147, filed Jun. 16, 2014, Office Action, dated Aug. 7, 2015.
U.S. Appl. No. 14/306,138, filed Jun. 16, 2014, Final Office Action, dated Sep. 14, 2015.
U.S. Appl. No. 14/319,765, filed Jun. 30, 2014, Advisory Action, dated Sep. 10, 2015.
U.S. Appl. No. 14/306,154, filed Jun. 16, 2014, Final Office Action, dated Nov. 16, 2015.
U.S. Appl. No. 14/306,138, filed Jun. 16, 2014, Interview Summary, dated Dec. 3, 2015.
U.S. Appl. No. 14/874,690, filed Oct. 5, 2015, First Action Interview, dated Dec. 21, 2015.
U.S. Appl. No. 14/306,147, filed Jun. 16, 2014, First Action Interview, dated Dec. 24, 2015.
U.S. Appl. No. 14/306,138, filed Jun. 16, 2014, Interview Summary, dated Dec. 24, 2015.
U.S. Appl. No. 14/645,304, filed Mar. 11, 2015, Office Action, dated Jan. 25, 2016.
U.S. Appl. No. 14/319,765, filed Jun. 30, 2014, Office Action, dated Feb. 1, 2016.
U.S. Appl. No. 14/306,154, filed Jun. 16, 2014, Advisory Action, dated Feb. 1, 2016.
U.S. Appl. No. 14/948,009, filed Nov. 20, 2015, First Action Interview, dated Feb. 25, 2016.

\* cited by examiner

DISTORTING A GRAPH ON A COMPUTER DISPLAY TO IMPROVE THE COMPUTER'S ABILITY TO DISPLAY THE GRAPH TO, AND INTERACT WITH, A USER

BENEFIT CLAIM

This application claims the benefit under 35 U.S.C. 119(e) of provisional application 62/246,769, filed Oct. 27, 2015, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention generally relates to displaying distorted graphs on a computer display and more specifically to distorting a graph with a plurality of nodes and presenting the distorted graph on a computer display to improve the computer's ability to display the graph to, and interact with, a user. SUGGESTED GROUP ART UNIT: 2611 (COMPUTER GRAPHICS PROCESSING AND SELECTIVE VISUAL DISPLAY SYSTEMS); SUGGESTED CLASSIFICATION: 345.

BACKGROUND

A graph is a data structure that defines a plurality of objects, referred to as nodes. A graph may also define relationships between nodes, referred to as edges. Graphs are used in a variety of applications. For example, a graph may comprise data about users in a social network. Each node may include information about a user in the social network, and the edges may indicate which users are friends in the social network.

Displaying a visualization of an entire graph on a display, particularly on a small device, such as a mobile phone, may make the visualization less useful. For example, a user may have a difficult time selecting a node in a graph if all the nodes in the graph are displayed at the same time. However, if a user zooms into the graph visualization to get a closer look at a particular node in the graph, then much of the graph may be pushed off screen and no longer visible.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Figure 1:
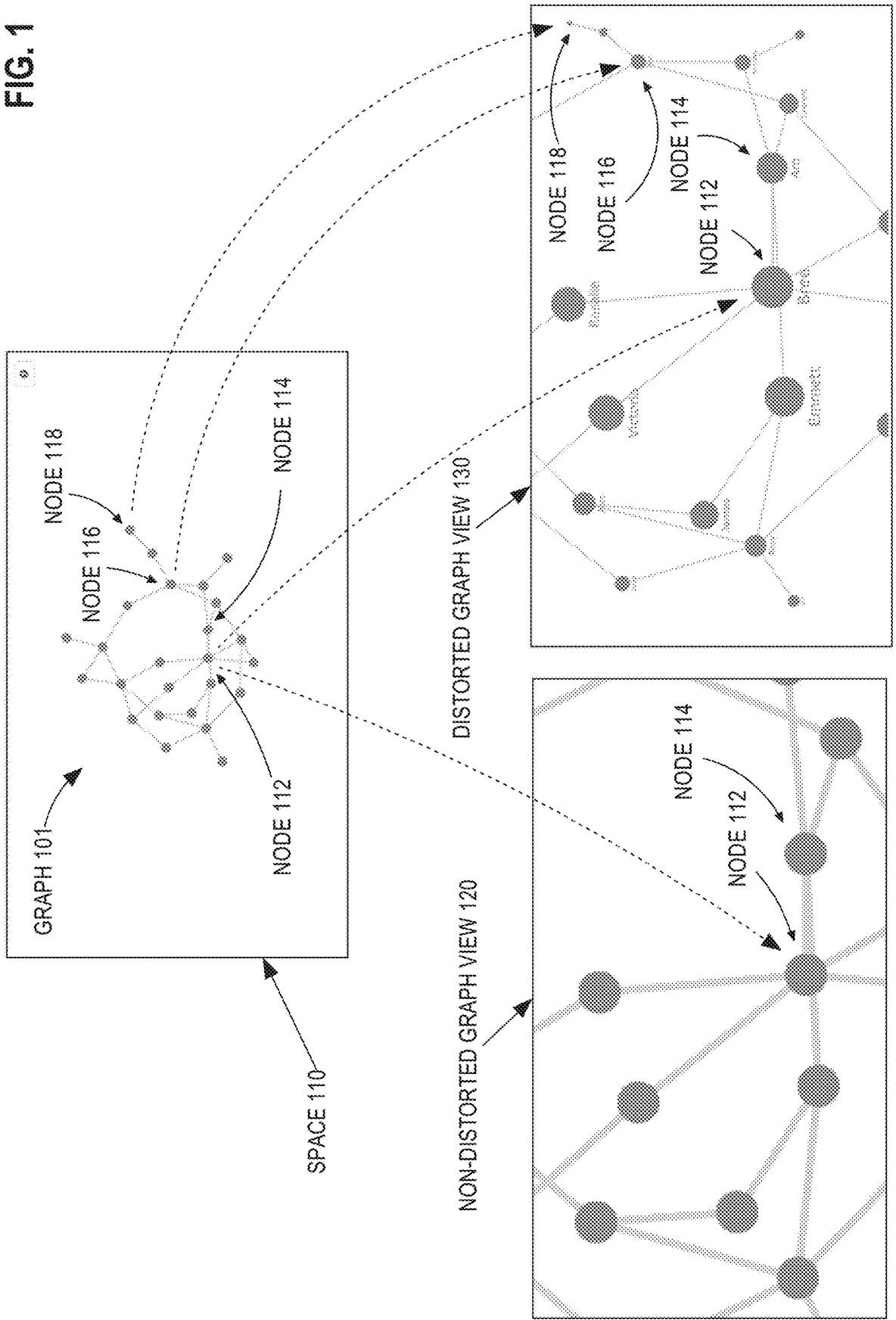
FIG. 1 illustrates (1) a graph with nodes assigned to locations in a space, (2) a graphical representation a region of the space without distorting the graph, and (3) a graphical representation of the region of the space after the graph was distorted based on a viewport that is proportional to a window on a computer display, in an example embodiment.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

TERMS, MEANINGS, AND EXAMPLES

For purposes of illustrating clear examples of the subject matter discussed in this disclosure, one or more meanings or examples may be associated with one or more terms throughout this disclosure. However, each meaning or example associated with each term is not meant to be exclusive. Furthermore, words, such as "or" may be inclusive or exclusive unless expressly stated otherwise. The following is a non-exclusive list of meanings and examples of particular terms used throughout this disclosure, one or more terms in the following list may be associate with one or more additional meanings or examples later discussed herein.

A "computer" or "device" may be one or more physical computers, virtual computers, and/or computing devices operably coupled to a display. As an example, a computer may be one or more desktop computers, laptop computers, mobile devices, cloud-based computers, and cloud-based cluster of computers, virtual computer instances or virtual computer elements such as virtual processors, storage and memory, and/or any other special-purpose computing devices coupled to a display and capable of causing a distorted graph to be displayed within a window of a graphical user interface on the display. A computer may comprise one or more processors that execute instructions or software stored in non-transitory computer-readable media or loaded into memory. Any reference to "a computer" herein may mean one or more computers, unless expressly stated otherwise.

A "computer process" or "process" means a process, thread, and/or instance of a program or application implemented as software and executed by a computer and/or virtual computer instance.

A process "performing" a step or method means the process causing a processor to perform the step or method by executing one or more computer instructions.

A "window" is an area on a display in which data is presented to a user. A window may, but need not, include a visual border or frame. A window may consume the entire viewable area of a display or a region of the viewable area of the display. A window may, but need not, be presented on a display with, or inside, one or more other windows.

A "space" is an n-dimensional domain over which locations are defined. For example, a space may be a two-dimensional domain with a horizontal and vertical axis; locations in the space may be defined by a Cartesian coordinate system, polar coordinate system, or other coordinate system. Also for example, a space may be a three-dimensional domain; locations in the space may be defined by a Cartesian coordinate system, spherical coordinate system, or other coordinate system.

A "viewport" is a region defined by a polygon within a space and indicates the boundaries of a graphical representation of a graph in the space. The size and shape of the viewport corresponds to the size and shape of a window on a display. A viewport may be a different scale than the corresponding window. For example, if a window is a rectangle, then the corresponding viewport is also a rectangle, and the aspect ratio of the window is the same as the aspect ratio of the viewport. Graphical representations of the region of the space within the viewport are rendered in the window on the display. However, in an embodiment, a window may include one or more overlays that partially occlude the graphical representation in the window.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are discussed herein for distorting a graph with a plurality of nodes and presenting the distorted graph on a computer display. These techniques improve the computer's ability to display the graph to, and interact with, a user. A graph may be visualized on a computer by assigning nodes in the graph to locations within a space, defining a viewport within the space, generating a graphical representation of the graph in the space based on the viewport, and displaying the graphical representation in a window on a display. Distorting the location assigned to each node in the graph allows a computer to (1) present one or more nodes in a particular area of interest to a user in a way that is easier for the user to select or interact with the one or more nodes, and (2) visualize more of the graph than a simple zoomed-in view. Additional effects and benefits are discussed further herein.

FIG. 1 illustrates (1) a graph with nodes assigned to locations in a space, (2) a graphical representation a region of the space without distorting the graph, and (3) a graphical representation of the region of the space after the graph was distorted based on a viewport that is proportional to a window on a computer display, in an example embodiment. In FIG. 1, graph 101 comprises a plurality of nodes, including node 112, node 114, node 116, and node 118, each of which are assigned to a location in space 110. Graph 101 also comprises edges, each of which define a relationship between two nodes in graph 101. The solid dots represent the nodes in graph 101 and the lines between the dots represent the edges.

Displaying a visualization of an entire graph on a display, particularly on a small device, such as a mobile phone, may make the visualization less useful. For example, a user may have a difficult time selecting a node in a graph if all the nodes in the graph are displayed at the same time. However, if a user zooms into the graph visualization to get a closer look at a particular node in the graph, then much of the graph may be pushed off screen and no longer visible. For example, non-distorted graph view 120 is a visualization of graph 101. The view has been zoomed into a particular node, node 112, so that a user can select node 112. Unfortunately, many of the nodes in graph 101, such as node 116 and node 118, are no longer visible. Because a visualization of a graph is often used to show relationships between nodes in the graph, a user loses information and context by zooming into the graph.

Non-distorted graph view 120 and distorted graph view 130 are views or graphical representations, in a graphical user interface, of the nodes and edges in graph 101 after the nodes have been assigned to locations in space 110. Non-distorted graph view 120 is a view of graph 101 based on a viewport defined in space 110. Distorted graph view 130 is a view of graph 101 that is also based on a viewport defined within space 110. However, in distorted graph view 130, the location of each node in graph 101 is also distorted based on the viewport defined within space 110.

Figure 2:
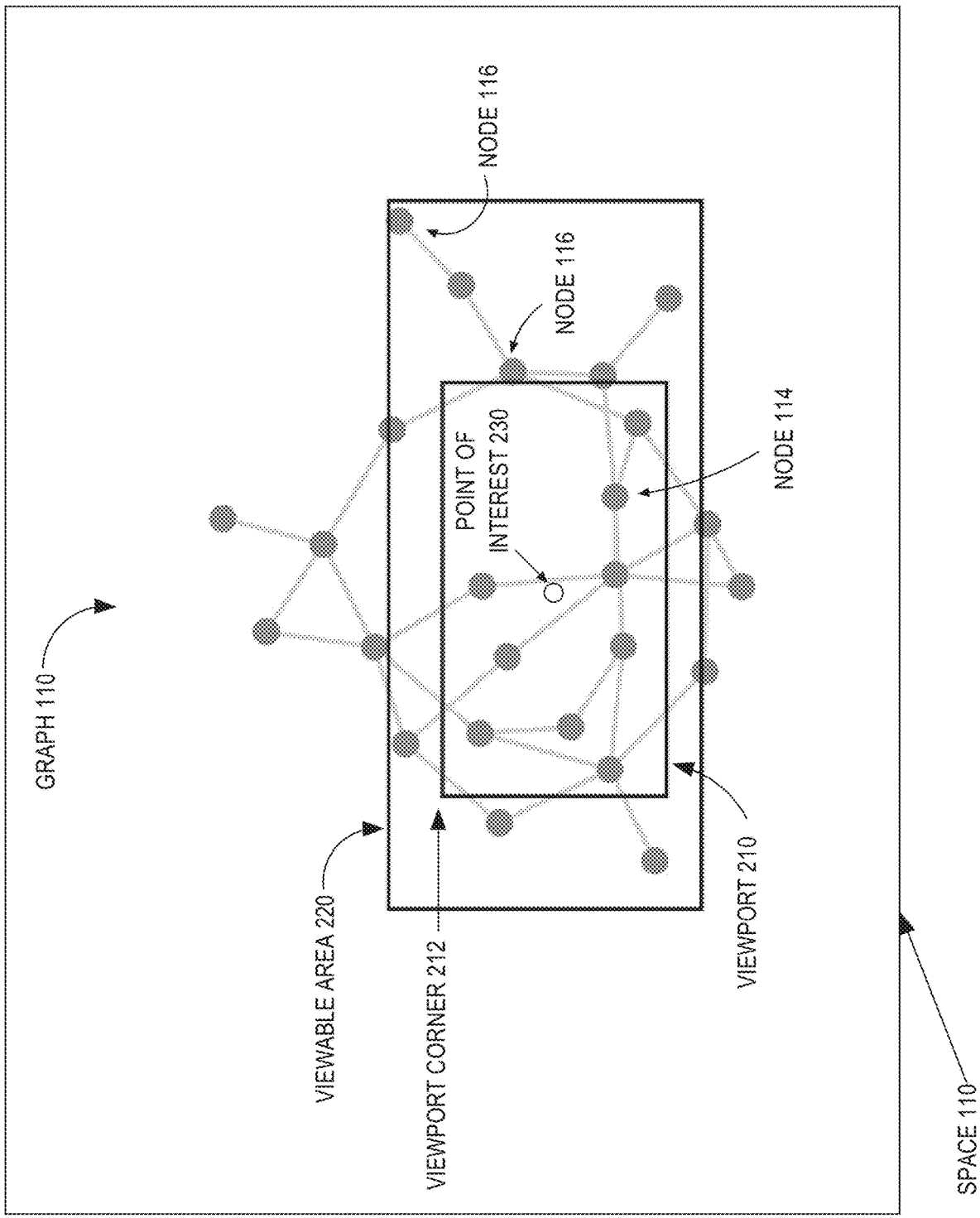
FIG. 2 illustrates a graph with nodes assigned to locations in a space, and a viewport within the space in an example embodiment.

A user can view more nodes in the graph after the graph is distorted based on the viewport that is proportional to the bounds of a corresponding window on a display. FIG. 2 illustrates a graph with nodes assigned to locations in a space, and a viewport within the space in an example embodiment. In FIG. 2, viewport 210 is an illustration of the viewport defined in space 110 to produce both non-distorted graph view 120 and distorted graph view 130. Accordingly, the nodes that are visible within viewport 210 are visible in non-distorted graph view 120, and the nodes that are not visible within viewport 210 are not visible in non-distorted graph view 120. In contrast, distorting the nodes in graph 101 based on viewport 210, causes distorted graph view 130 to have a greater viewing area than non-distorted graph view 120. For example, node 116 and node 118 are included in distorted graph view 130, but not in non-distorted graph view 120. Viewable area 220 illustrates the approximate viewable area of graph 101 in space 110 after the locations of the nodes in graph 101 are distorted based on viewport 210, which is proportional to a window on a display.

A user can interact with nodes near a particular point of interest more easily after the nodes in the graph are distorted. For example, node 112 and node 114 are further from each other in distorted graph view 130 than in non-distorted graph view 120. Furthermore, the graphical elements that represent the nodes can be modified. For example, node 112 is represented with a larger dot than node 114. Accordingly, a user can select node 112 more easily, without accidently selecting node 114, especially on a small touch screen display.

Additional features further increase the ability of the computer to present a graph to, and interact with, a user. These features are discussed further herein.

PROCESS FOR GENERATING A GRAPHICAL REPRESENTATION OF A DISTORTED GRAPH BASED ON A WINDOW ON A DISPLAY

Figure 5:
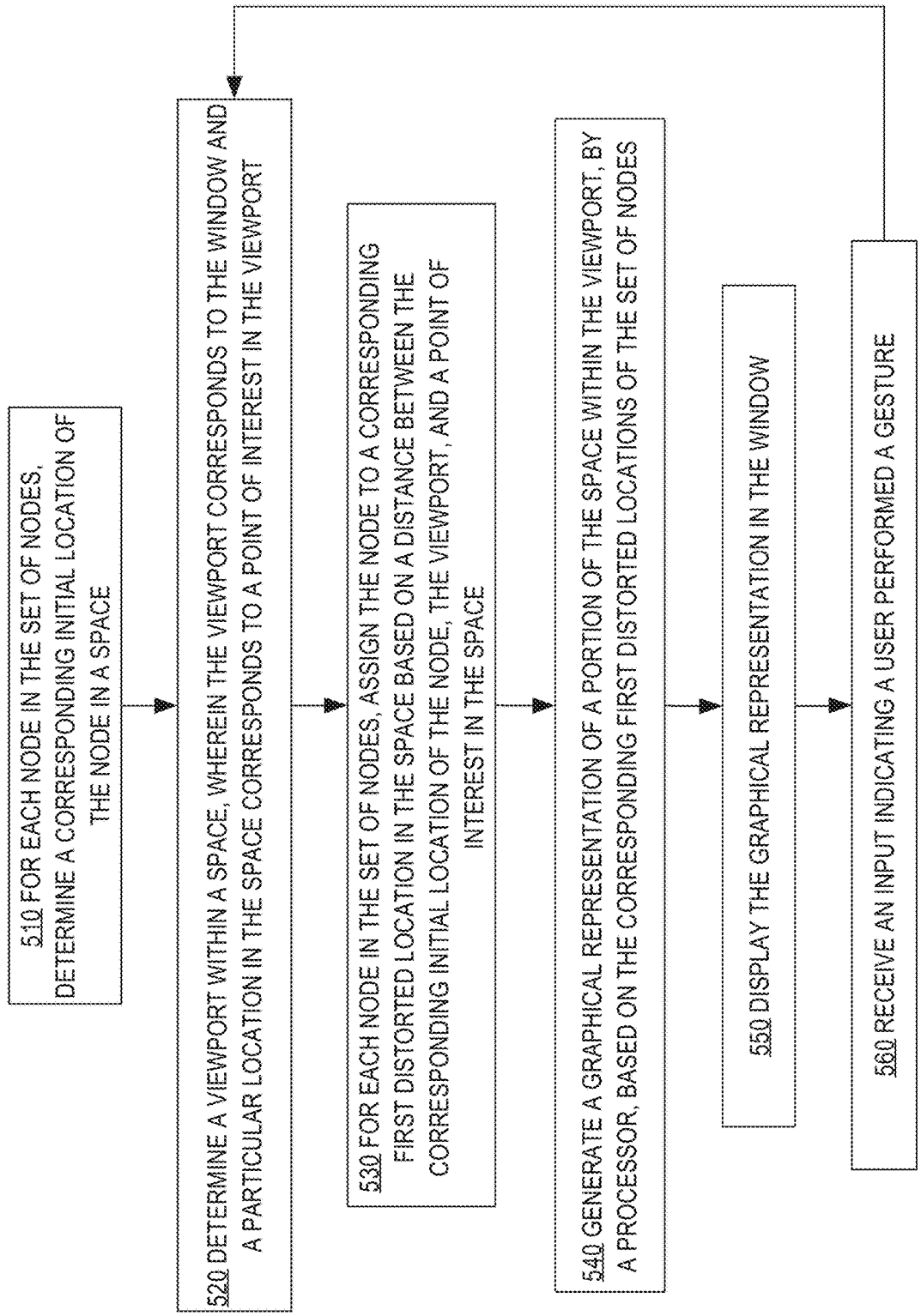
FIG. 5 illustrates steps for distorting a graph with a plurality of nodes and presenting the distorted graph on a computer display to improve the computer's ability to display the graph to, and interact with, a user in an example embodiment.
Figure 6:
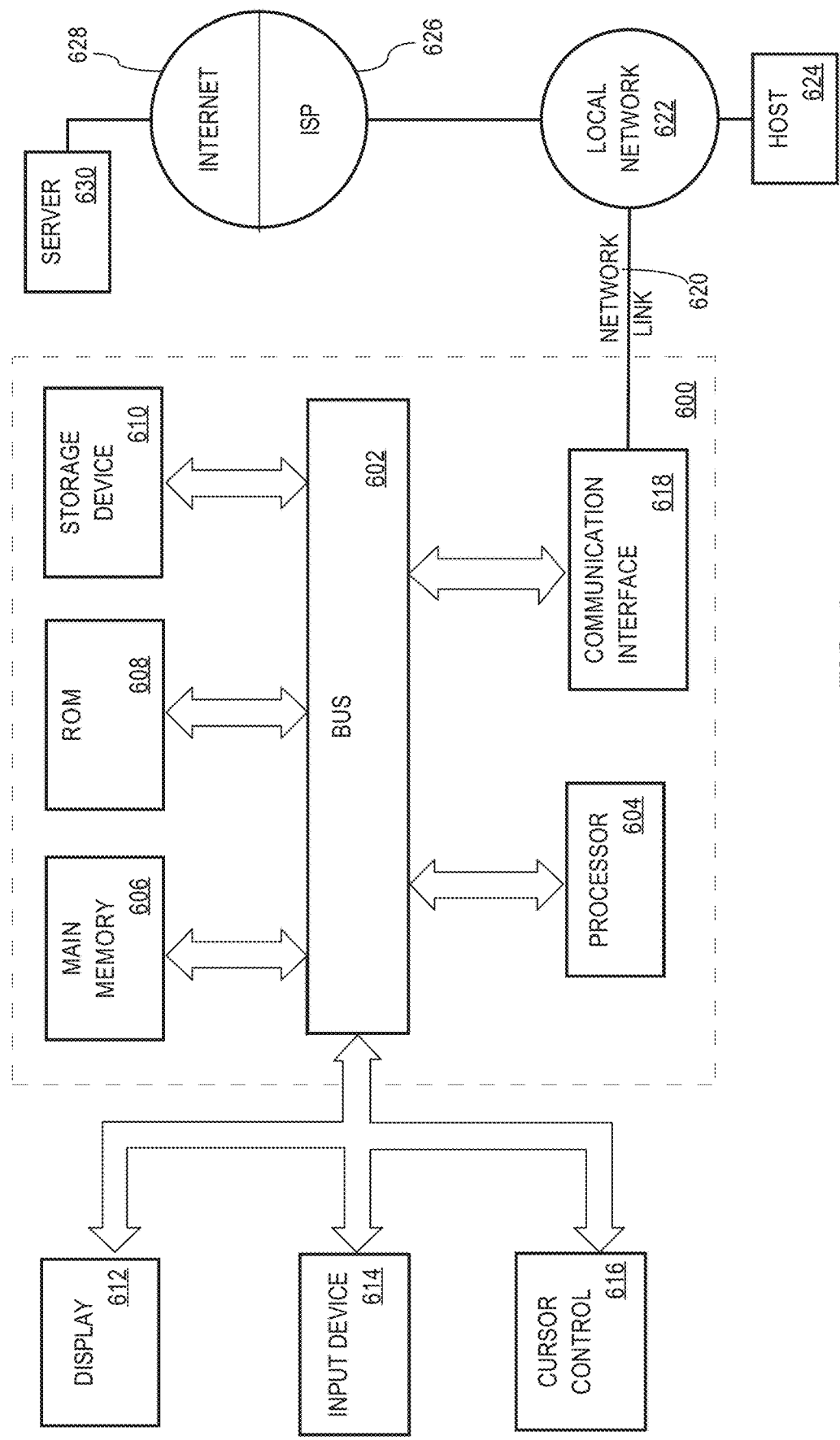
FIG. 6 is a block diagram that illustrates a computer system upon which an embodiment of the invention may be implemented.

FIG. 5 illustrates steps for distorting a graph with a plurality of nodes and presenting the distorted graph on a computer display to improve the computer's ability to display the graph to, and interact with, a user in an example embodiment. For purposes of illustrating clear examples, the nodes will be assigned locations on a two-dimensional plane. However, in other embodiments, the nodes can be assigned to different surfaces in one or more dimensions. For example, nodes in a graph can be assigned locations on a unit sphere in a space.

Assigning an Initial Location to Each Node in a Graph

In step 510, a computer process, or software executed on a computer, determines, for each node in a set of nodes in a graph, a corresponding initial location of the node in a space. For example, a computer process assigns each node in in graph 101 a random location within space 110 using one or more pseudo-random number generators. Additionally or alternatively, the computer process may assign each node in graph 101 a location within space 110 using a spacing algorithm, such as a force directed graph. In a force directed graph, each node is assigned a force, and the forces are applied to the nodes until an equilibrium is reached. Additionally or alternatively, the computer process may receive input from a user indicating one or more locations within space 110 to assign to one or more nodes in graph 101, respectively. For example, whether or not the nodes were initially assigned locations automatically, or by a user, a user may subsequently change the location of a node by selecting the graphical element that represents a node using a touch screen or a mouse, and dragging the graphical element to a new location in space 110. The process assigns the new location to the node that corresponds to the selected graphical element.

Determining a Viewport and Point of Interest

In step 520, the computer process determines a viewport within the space, wherein the viewport corresponds to the window and a particular location in the space corresponds to a point of interest in the viewport, and a point of interest within the space. For purposes of illustrating a clear example, assume the following:

A particular window will present a graphical representation of graph 101 in space 110;

The particular window has a 16:9 aspect ratio that spans the entire displayable area of a 1920 by 1080 pixel display;

The initial locations of the nodes in graph 101 are spread over space 110.

The computer process defines viewport 210 with the same aspect ratio in space 110 as the window on the display (16:9). In an embodiment, the computer process determines a viewport to be the minimum bounding rectangle ("MBR") that encompasses all of the locations assigned to the nodes in graph 101 in space 110, and also has the same aspect ratio as the particular window on a display that will present the resulting graphical representation. In an embodiment, the computer process defines viewport 210 based on predefined user settings, inputs, or gestures discuss further herein.

The computer process determines a point of interest in space 110. The point of interest may be a center point within space 110, the origin of space 110, a point that is the average of the locations assigned to nodes in graph 101, a location associated with a particular node in graph 101 in space 110, a location specified by a user, a hardcoded location in space 110, the center point of viewport 210 in space 110, or any other point in space 110.

Distorting the Locations of Nodes in a Graph Based on the Viewport

In step 530, the computer process, assigns, for each node in a set of nodes in a graph, a corresponding distorted location in the space to the node based on a distance between the corresponding initial location of the node, the viewport, and a point of interest in the space. For purposes of illustrating a clear example, assume the following:

Each node in in graph 101 is assigned a corresponding initial location in space 110 as illustrated in FIG. 2.

Viewport 210 is defined in space 110 as illustrated in FIG. 2.

The computer process determines a distorted location for each node in graph 101 using one or more distortion functions, such as a fish-eye distortion. In an embodiment, the distortion function is a piecewise function. The following equation is the particular distortion function that a computer process used to generate a distorted location for each node in graph 101 according to the embodiment illustrated in distorted graph view 130:

$$d(t) = \begin{cases} t, & t < 0.5 \\ 0.5 + \dfrac{t - 0.5}{2}, & 0.5 \le t < 1 \\ 0.75 + \dfrac{t - 1}{4}, & 1 \le t < 1.5 \\ 0.875 + \dfrac{t - 1.5}{8}, & 1.5 \le t < 2.5 \\ 1, & 2.5 \le t \end{cases}$$

In this piece-wise distortion function, d(t) represents a scalar value used to scale the distance of the initial location of the node from the point of interest based on a value t (discussed in detail further herein). For purposes of illustrating a clear example of distorting a location of a node in a space based on a point of interest in the space, assume the following:

Point of interest 230 is at a point $\vec{A}$ in space 110;

The location of node 112 is at a point $\vec{B}$ in space 110;

A difference vector, $\vec{C}$, in space 110, is equal to $\vec{A}$ minus $\vec{B}$; and The value of t is 0.25.

The distorted location for node 112, $\vec{D}$, is:

$$\vec{D} = \vec{B} + (0.25 \times \vec{C})$$

As a more concrete example, if location of node 112 ($\vec{B}$) is <4, 4>, t is 0.25, and the point of interest 230 ($\vec{A}$) is at the origin (<0, 0>) of space 110, then the distorted location for node 112 ($\vec{D}$) is <1, 1>.

In the function d(t), t represents a ratio based on the size of the window on the display or the viewport:

$$t = \frac{d_0}{h}$$

In the equation above, $d_0$ represents the distance between a point of interest in viewport 210 and an edge point of viewport 210. In other words, because the viewport 210 represents the bounds of a window, on a computer display, in space 110, $d_0$ is a distance that is proportional to the distance between a point of interest in the window and an edge point of the window on the computer display. For purposes of illustrating a clear example, point of interest 230 in FIG. 2 is the point of interest used to generate distorted graph view 130, and point of interest 230 is the center of viewport 210 in space 110. If viewport 210 is moved or transformed within space 110, then the computer process determines the new point of interest by determining the center point of the viewport 210 in space 110, or by transforming point of interest 230 using the same transformation that transformed viewport 210. Additionally or alternatively, the computer process may receive input from a user selecting a new point within viewport 210 or space 110 to use as the point of interest. The edge point of viewport 210 that was used to generate distorted graph view 130 was one of the corners of viewport 210: viewport corner 212.

Also in the equation above, h represents the distance between the initial location of the node being distorted and the point of interest. For example, for node 112, h is the distance between the initial location assigned to node 112 in space 110 and point of interest 230 in space 110. Because point of interest 230 is a point in viewport 210, point of interest 230 corresponds to a focal point or point of interest in the window on a display.

Returning to the piece-wise distortion function above, d(t), four different distortions are applied to the locations assigned to nodes in four different regions of space, respectively. For example, a computer process using the piece-wise distortion function above assigns, to each node in a first region (t<0.5), if any, a distorted location that is different than the node's initial location unless the initial location of the node is the same as the point of interest. The computer process assigns, to each node in a second region (1≤t<1.5), if any, a distorted location that is different than the node's initial location. The computer process assigns, to each node in a third region (1.5≤t<2.5), if any, a distorted location that is different than the node's initial location. And, the computer process assigns, to each node in a fourth region (2.5≤t), if any, a distorted location that is the same as the node's initial location.

Generating a Graphical Representation of Nodes in a Graph

In step 540, the computer process generates a graphical representation of a portion of the space within the viewport based on the corresponding distorted locations of the set of nodes. For example, the computer process generates an image of space 110 with a graphical element that corresponds with each node and edge in graph 101, and crops or clips the image to include a region of the image that corresponds to viewport 210 in space 110. In distorted graph view 130, each node is represented with a circle as the graphical element, and each edge is represented with a line as the graphical element. However, the graphical element associated with a node or edge may be different. For example, the computer process may render a graphical element associated with each node differently based on the distorted location of the node. Also for example, a graphical element that corresponds with a node that represents a user in a social network may be a picture of the user as the graphical element. The following is a list of some of the ways a graphical element may change based on a node, the initial location of the node, the distorted location of the node, or attribute or data associated with the node.

Determining the Size of a Graphical Element

The computer process may determine the size of a graphical element that corresponds with a node based on the distance between the corresponding initial location of the node and the particular location in the space. In the embodiment illustrated in distorted graph view 130, the particular location is point of interest 230 in space 110, and the following equation is the equation used by a computer process to determine the radius of the graphical element associated with each node:

$$r(t) = \min(1, 2^{-2(t-0.25)})$$

In an embodiment, r(t) represents the width, height, or other size attribute of a graphical element for a node. The parameter t represents the same as t in the distortion function d(t). In an embodiment, t is based on the distorted location assigned to a node rather than the initial location assigned to the node.

Determining the Opacity of a Graphical Element

The computer process may modify the opacity of a graphical element that corresponds with a node based on the distance between the corresponding initial location of the node and the particular location in the space. In the embodiment illustrated in distorted graph view 130, the computer process determine the opacity of the graphical element associated with node using the following equation:

$$on(t) = \begin{cases} 1, & t < 1 \\ 1 + \frac{t-1}{4}, & 1 \leq t < 2 \\ 0.75 + 0.75(t-2), & 2 \leq t < 3 \\ 0, & 3 \leq t \end{cases}$$

In the equation above, on(t) represents the opacity of a graphical element for a node. The parameter, t, represents the same as t in the distortion function d(t). In an embodiment, t, in the function on(t), represents based on the distorted location assigned to a node rather than the initial location assigned to the node.

Determining the Opacity or Size of a Text in a Graphical Element

The computer process may generate a graphical element with text to indicate the graphical element corresponds to a particular node. For example, in distorted graph view 130, the graphical element that represents node 112 has a label with the name "Bree". In this example, the nodes in graph 101 represent people in a social network, and node 112 corresponds with a user name Bree in the social network. The computer process determines the opacity of the text for each node based on the distance between the corresponding initial location of the node and the particular location in the space. In an embodiment, the computer process uses the following equation to determine the opacity of the text in a graphical element associated with a node:

$$ol(t) = \begin{cases} 1, & t < 1 \\ 3 - 2t, & 1 \leq t < 1.5 \\ 0, & 1.5 \leq t \end{cases}$$

In the equation above, ol(t) represents the opacity of a graphical element for a node. If ol(t) is equal to one, then the text is completely opaque, if ol(t) is equal to zero, then the text is completely transparent. For example, the text "Bree" that is part of the text that is part of the graphical element that represents node 112 in distorted graph view 130 is mostly opaque, and the text that is part of the graphical element that represents node 118 is completely transparent.

The computer process may determine the size of the text for each node based on the distance between the corresponding initial location of the node and the particular location in the space. In an embodiment, the computer process uses the following equation to determine the size of the text in a graphical element associated with a node:

$$s(t) = \begin{cases} 12, & t < 1 \\ 10, & 1 \le t < 2 \\ 8, & 2 \le t < 3 \\ 0, & 3 \le t \end{cases}$$

In the equation above, s(t) represents the point size of the text in a graphical element for a node. For example, if s(t) for a particular node is 12, then the text of the graphical element that corresponds to the node is 12 point text.

The parameter t, in the functions ol(t) and s(t), represents the same as t in the distortion function d(t). In an embodiment, t in the functions on(t), ol(t), and s(t), is based on the distorted location assigned to a node rather than the initial location assigned to the node.

Displaying the Graphical Representation or View in a Window

Figure 3:
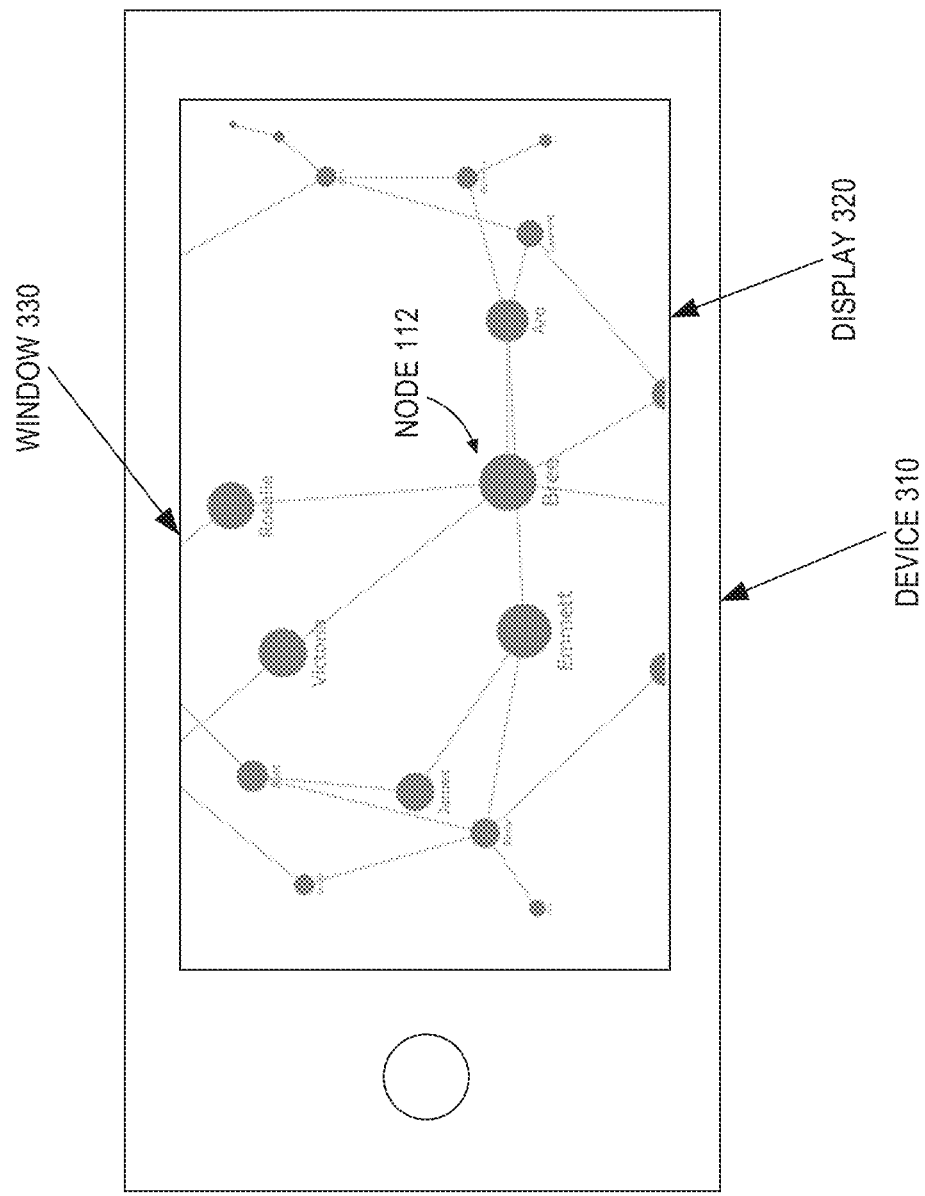
FIG. 3 illustrates a computer or device with a display, and window that spans the display and presents a graphical illustration of a graph is a space in an example embodiment.

Returning now to FIG. 5, in step 550, the computer process displays the graphical representation in the window. For example, the computer process generates distorted graph view 130 in a window that is proportional to viewport 210 in space 110, by cropping the graphical representation of space 110 generated in step 540 according to viewport 210, and causing the cropped image to be displayed in a window on a computer display, as seen in FIG. 3. FIG. 3 illustrates a computer or device with a display, and window that spans the display and presents a graphical illustration of a graph is a space in an example embodiment. In FIG. 3, device 310 includes display 320, which has window 330. Window 330 spans display 320 and is proportional to viewport 210 and presents distorted graph view 130.

INTERACTING WITH THE GRAPH

The computer process may receive input from a user indicating that the user has selected a node, selected a subset of the nodes in the graph, moved the viewport, resized the viewport, changed the size of the window, or in some way changed the nodes, graph, or the viewport. After the change is applied, the computer process repeats steps 520 through 550. For example, in step 560, the computer process receives an input indicating a user performed a gesture, such as selecting a graphical element that corresponds to a node in the graph. In response, the computer process returns to step 520. In FIG. 5, the computer process returns to step 520; however, the computer process may return to another step instead of returning directly to step 520.

Selecting a Node in a Graph

A user may select in a graph and, in response, the computer process updates the underlying graph or the graphical representation of the graph in the space. For purposes of illustrating a clear example of responding to a gesture or user input, assume a user touches the graphical element associated with node 112 on display 320. In response, the computer process returns to step 520: in revisited step 520, the computer process moves viewport 210 so that the center of viewport 210, or point of interest 230, is the same location in space 110 as the initial location of node 112.

In revisited step 530, the computer process assigns a new distorted location to each node based on the modified viewport 210. However, based on the distortion function used, which in this case is d(t) discussed above, the distorted location of node 112 is the same as the initial location of node 112, and the graphical element is at the center of moved viewport 210, and thus window 330 on display 320.

Figure 4:
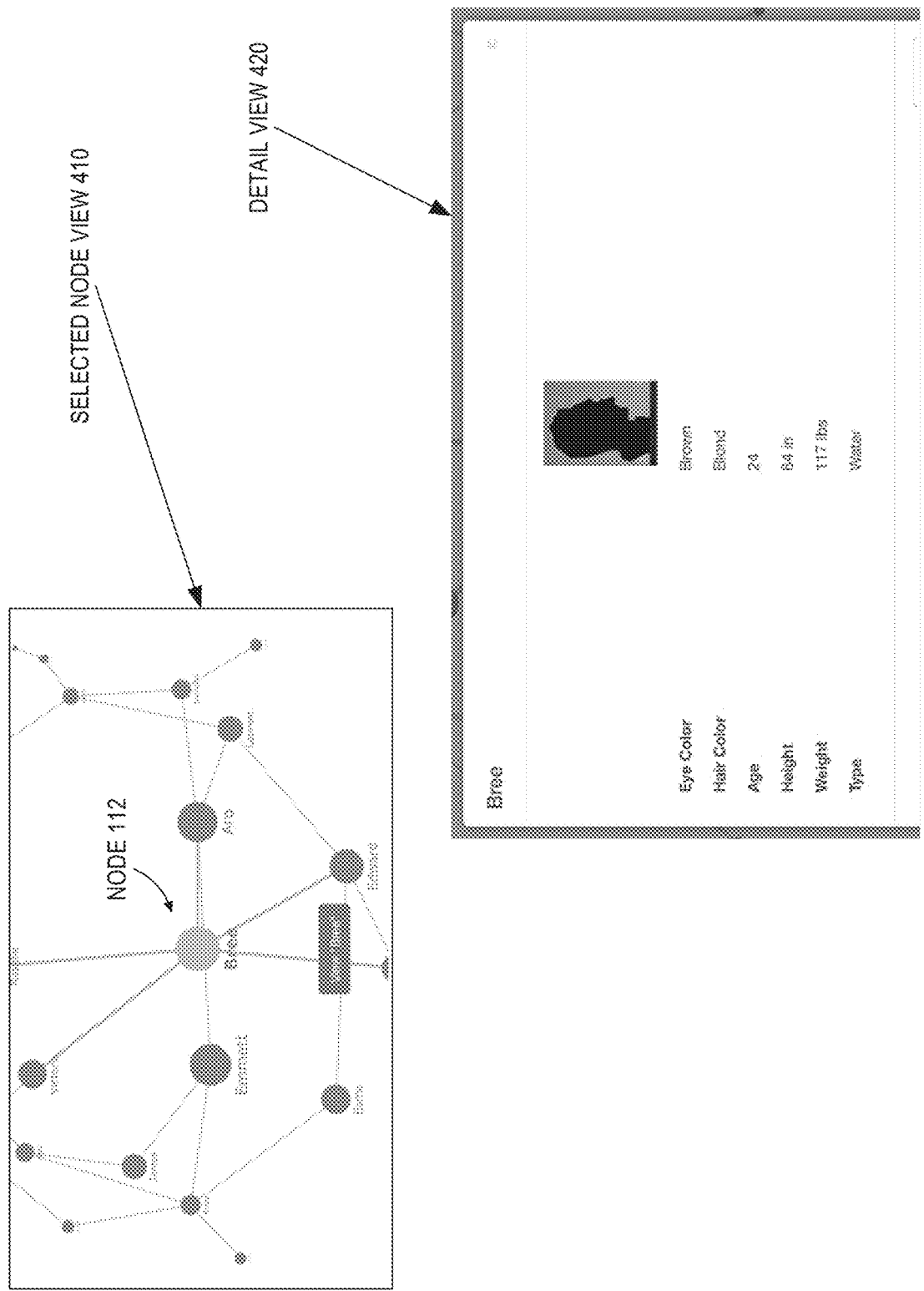
FIG. 4 illustrates a distorted graph with a selected node and a detail view of a node in an example embodiment.

In revisited step 540, the computer process generates a graphical representation of graph 101 in space 110 based on moved viewport 210 as discussed herein. Additionally, in response to node 112 being selected, in step 540, the process may modify, highlight, or otherwise change or update the graphical element associated with node 112. For example, and as illustrated in selected node view 410, the graphical element that corresponds to node 112 is a different color or opacity. Additionally, one or more of the edges connected to node 112, or one or more nodes directly associated with node 112 via an edge in graph 101, may be presented in a graphical representation of graph 101 with a different color, opacity, or other visual distinction than the other nodes or edges in a graphical visualization of graph 101. FIG. 4 illustrates a distorted graph with a selected node and a detail view of a node in an example embodiment. Selected node view 410, in FIG. 4, is a graphical representation of graph 101 in space 110 after translating viewport 210 in response to receiving input from a user indicating that the user selected node 112 on display 320 in FIG. 3. Accordingly, in revisited step 550, the computer process causes display 320 to display selected node view 410 in window 330.

Presenting Additional Data Associated with a Selected Node

In response to selecting a node, the computer process may generate a graphical representation of space 110 based on the selected node and one or more nodes that have edges connecting the one or more nodes to the selected node. For example, in response to receiving input that a user selected node 112, the computer process may generate a graphical representation based on a sub-graph of graph 101 or a subset of the nodes in graph 101 using one or more of the methods discussed herein. In this example, the sub-graph or subset of nodes includes node 112, and the one or more nodes that share at least one edge with the selected node (node 112) directly. The sub-graph or subset of nodes does not include the one or more nodes that do not share an edge that associates the node with the selected node (node 112), or that are associated to the selected node through one or more other nodes.

Additional buttons or inputs may be added to display details related to a particular node. For example, in FIG. 4, the computer process causes button 412 "View Bree" to be presented on display 320 in response to receiving input indicating that a user selected node 112. In response to receiving user input indicating that a user selected button 412, the computer process causes the information associated with node 112 to be presented. For example, the computer process causes detail view 420 to be presented in window 330 on display 320.

Translating the Viewport of the Graph

In response to input indicating that a user performed a dragging or sliding gesture, the computer process may translate the viewport, or the locations assigned to nodes in a graph, in the space. For example, in response to a user dragging a finger 100 pixels across window 330 in display 320, the computer process returns to step 520 and translates viewport 210 100 units in in space 110. The computer process continues to perform steps 530 through 550 to present a new distorted graphical representation of graph 101 in window 330 based on the translated viewport 210. A dragging gesture may be performed many ways. For example, a dragging gesture may be performed by a user dragging their finger over a touch screen, or sliding a cursor over a window while a button is held down.

In one or more of the examples above, the viewport was moved in response to user input and the initial locations of nodes are stationary. In an embodiment, the initial locations of the nodes are moved and the viewport is stationary. For example, in response to selecting node 112, the computer process may add a movement vector the initial location of each node in graph 101, such that the initial location of node 112 becomes the same as point of interest 230 in space 110. In this example, the movement vector is $\vec{n} - \vec{p}$, where $\vec{n}$ is the initial location of node 112, and $\vec{p}$ is the point of interest 230 in space 110.

Zooming

A computer process may generate a "zoomed in" or "zoomed out" graphical representation of a space by changing the size of the viewport in response to user input. The user input may be a gesture, such as a pinching or spreading gesture. For example, in response to input indicating that the user performed a spreading gesture, the computer process returns to step 520 and constricts viewport 210 in space 110, which will cause a zoomed in view. Or, in response to input indicating that the user performed a pinching gesture, the computer process returns to step 520 and expands viewport 210 in space 110, which will cause a zoomed out view. After updating the viewport in step 520, the computer process continues to perform steps 530 through 550 to present a new distorted graphical representation of graph 101 in window 330. The aspect ratio of viewport 210 after constriction or expansion still matches the aspect ratio of the corresponding window, which in in this example is window 330 on display 320.

Switching from a Distorted Graph View to a Non-Distorted Graph View

In response to receiving input indicating a user performed a first gesture, the computer process may generate a non-distorted view or graphical representation of a graph, and present the non-distorted graphical representation in the window. For example, after presenting distorted graph view 130 in window 330, and in response to receiving input indicating that a user performed a gesture, such as a pinching gesture, the computer process generates a non-distorted graphical representation of graph 101, such as non-distorted graph view 120. The computer process causes the non-distorted graphical representation of graph 101 to be presented in window 330. The non-distorted graphical representation may be zoomed in, as illustrated in non-distorted graph view 120, or zoomed out to show all the nodes in graph 101.

After presenting a non-distorted graphical representation of a graph, and in response to receiving input indicating a user performed a second gesture, the computer process generates a distorted graphical representation of the graph. The second gesture may be the same or different than the first gesture. For example, after displaying a non-distorted graphical representation of graph 101 in space 110, and in response to receiving input indicating that a user performed a spread gesture, the computer process generates a distorted graphical representation of graph 101 in space 110, in window 330, as illustrated in FIG. 3.

Searching for Nodes in a Graph

The methods and systems discussed herein may be used to visualize all the nodes in a graph, or a sub-graph or subset of the graph comprising one or more of the nodes. For example, window 330 may display a search bar, and in response to receiving one or more search parameters via the search bar from a user, the computer process generates a new graph that is a sub-graph of the original graph. Each node in the new graph has data that matches the one or more search parameters. The computer process performs steps 510 through 550 to generate and render a graphical representation of the new graph in window 330 on a display 320.

HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system for visualizing a graph in a window of a graphical user interface comprising:
  a display;
  a memory comprising a set of instructions and data defining a set of nodes;
  one or more processors coupled to the memory and the display, wherein the one or more processors execute the set of instructions, which causes the one or more processors to:
  for each node in the set of nodes, determine a corresponding initial location of the node in a space;
  determine a viewport within the space, wherein:
  the viewport corresponds to the window; and
  a particular location in the space corresponds to a point of interest in the viewport;
  for each node in the set of nodes, assign the node to a corresponding first distorted location in the space based on a piecewise distortion function of a ratio of a distance between the particular location and an edge point of the viewport to a distance between the corresponding initial location of the node and the particular location in the space,
    each piece of the distortion function being tied to specific values of the ratio;
  for each node in the set of nodes, generate a corresponding graphical element for the corresponding first distorted location, the graphical element having an opacity that is based on the distance between the corresponding initial location of the node and the particular location in the space;
  generate a first graphical representation of a region of the space within the viewport, by one or more processors, with the corresponding graphical elements at the corresponding first distorted locations of the set of nodes;
display, in the window, the first graphical representation.

2. The computer system of claim 1, wherein the viewport has a center point, and the center point is the point of interest.

3. The computer system of claim 1, the opacity being further based on a distance between the particular location and the edge point of the viewport.

4. The computer system of claim 1,
for each node of one or more nodes in the set of nodes, the corresponding graphical element further having a size that is based on the distance between the corresponding initial location of the node and the particular location in the space.

5. The computer system of claim 1, the opacity being determined by a piecewise function.

6. The computer system of claim 1,
for each node of one or more nodes in the set of nodes, the corresponding graphical element further having text with a size that is based on the distance between the corresponding initial location of the node and the particular location in the space.

7. The computer system of claim 1,
for each node of one or more nodes in the set of nodes, the corresponding graphical element further having text with an opacity that is based on the distance between the corresponding initial location of the node and the particular location in the space.

8. The computer system of claim 1, wherein the set of instructions further cause the one or more processors to:
determine that a user has performed a sliding gesture, and in response:
translate the viewport in the space to produce a translated viewport, wherein a new point of interest in the translated viewport corresponds to a new particular location in the space;
for each node in the set of nodes, assign the node to a corresponding second distorted location in the space based on a distance between the corresponding initial location of the node and the new particular location in the space;
generate a second graphical representation of a new region of the space within the translated viewport based on the corresponding second distorted location of each node in the set of nodes;
display, in the window, the second graphical representation.

9. The computer system of claim 1, wherein:
the corresponding initial location of a particular node in the space is the same as the particular location in the space that corresponds to the point of interest in the viewport;
the corresponding first distorted location assigned to the particular node in the space is the same as the particular location in the space that corresponds to the point of interest in the viewport.

10. The computer system of claim 1, wherein the set of instructions further cause the one or more processors to, receive input indicating that a user has selected a particular node displayed in the window on the display, and in response:
translate the viewport in the space to produce a translated viewport, wherein a new point of interest in the translated viewport corresponds to a new particular location in the space, which is the same as the corresponding initial location of the particular node;
for each node in the set of nodes, assign the node to a corresponding second distorted location in the space based on a distance between the corresponding initial location of the node and the new particular location in the space;
generate a second graphical representation of a new region of the space within the translated viewport based on the corresponding second distorted location of each node in the set of nodes;
display, in the window, the second graphical representation.

11. The computer system of claim 1, wherein the set of instructions further cause the one or more processors to:
receive input indicating that a user has selected a subset of nodes in the set of nodes;
for each node in the subset of nodes:
determine a second corresponding initial location of the node in the space; and
assign the node to a corresponding second distorted location in the space based on a distance between the second corresponding initial location of the node and the particular location in the space;
generate a second graphical representation of the region of the space within the viewport based on the corresponding second distorted location of each node in the subset of nodes;
display, in the window, the second graphical representation.

12. The computer system of claim 1, wherein the set of instructions further cause the one or more processors to, determine that a user has performed a spreading gesture, and in response:
generate a second graphical representation of the region of the space within the viewport based on the corresponding initial location of each node in the set of nodes, but not based on the corresponding first distorted location of each node in the set of nodes;
display, in the window, the second graphical representation.

13. The computer system of claim 12, wherein the set of instructions further cause the one or more processors to, determine that the user has performed a pinching gesture, and in response, display the first graphical representation in the window and not the second graphical representation.

14. A computer-implemented method for distorting locations corresponding to a set of nodes in a graph to present in a window of a graphical user interface, the computer-implemented method comprising:
for each node in the set of nodes, determining a corresponding initial location of the node in a space;
determining a viewport within the space, wherein:
the viewport corresponds to the window; and
a particular location in the space corresponds to a point of interest in the viewport;
for each node in the set of nodes, assigning the node to a corresponding first distorted location in the space based on a piecewise distortion function of a ratio of a distance between the particular location and an edge point of the viewport to a distance between the corresponding initial location of the node and the particular location in the space,
each piece of the distortion function being tied to specific values of the ratio;
for each node in the set of nodes, generate a corresponding graphical element for the corresponding first distorted location, the graphical element having an opacity that is based on the distance between the corresponding initial location of the node and the particular location in the space;

generating a first graphical representation of a region of the space within the viewport, by one or more processors, with the corresponding graphical elements at the corresponding first distorted locations of the set of nodes;

displaying, in the window, the first graphical representation.

15. The computer-implemented method of claim 14, wherein the viewport has a center point, and the center point is the point of interest.

16. The computer-implemented method of claim 14, the opacity being further based on a distance between the particular location and the edge point of the viewport.

17. The computer-implemented method of claim 14, for each node of one or more nodes in the set of nodes, the corresponding graphical element further having a size that is based on the distance between the corresponding initial location of the node and the particular location in the space.

18. The computer-implemented method of claim 14, the opacity being determined by a piecewise function.

19. The computer-implemented method of claim 14, for each node of one or more nodes in the set of nodes, the corresponding graphical element further having text with a size that is based on the distance between the corresponding initial location of the node and the particular location in the space.

20. The computer-implemented method of claim 14, for each node of one or more nodes in the set of nodes, the corresponding graphical element further having text with an opacity that is based on the distance between the corresponding initial location of the node and the particular location in the space.

21. The computer-implemented method of claim 14 further comprising:
determining that a user has performed a sliding gesture, and in response:
translating the viewport in the space to produce a translated viewport, wherein a new point of interest in the translated viewport corresponds to a new particular location in the space;
for each node in the set of nodes, assigning the node to a corresponding second distorted location in the space based on a distance between the corresponding initial location of the node and the new particular location in the space;
generating a second graphical representation of a new region of the space within the translated viewport, by the one or more processors, based on the corresponding second distorted location of each node in the set of nodes;
displaying, in the window, the second graphical representation.

22. The method of claim 14, wherein:
the corresponding initial location of a particular node in the space is the same as the particular location in the space that corresponds to the point of interest in the viewport;
the corresponding first distorted location assigned to the particular node in the space is the same as the particular location in the space that corresponds to the point of interest in the viewport.

23. The computer-implemented method of claim 14 further comprising, receiving input indicating that a user has selected a particular node displayed in the window on the display, and in response:
translating the viewport in the space to produce a translated viewport, wherein a new point of interest in the translated viewport corresponds to a new particular location in the space, which is the same as the corresponding initial location of the particular node;
for each node in the set of nodes, assigning the node to a corresponding second distorted location in the space based on a distance between the corresponding initial location of the node and the new particular location in the space;
generating a second graphical representation of a new region of the space within the translated viewport, by the one or more processors, based on the corresponding second distorted location of each node in the set of nodes;
displaying, in the window, the second graphical representation.

24. The computer-implemented method of claim 14 further comprising:
receiving input indicating that a user has selected a subset of nodes in the set of nodes;
for each node in the subset of nodes:
determining a second corresponding initial location of the node in the space; and
assigning the node to a corresponding second distorted location in the space based on a distance between the second corresponding initial location of the node and the particular location in the space;
generating a second graphical representation of the region of the space within the viewport, by the one or more processors, based on the corresponding second distorted location of each node in the subset of nodes;
displaying, in the window, the second graphical representation.

25. The computer-implemented method of claim 14 further comprising, determining that a user has performed a spreading gesture, and in response:
generating a second graphical representation of the region of the space within the viewport, by the one or more processors, based on the corresponding initial location of each node in the set of nodes, but not based on the corresponding first distorted location of each node in the set of nodes;
displaying, in the window, the second graphical representation.

26. The computer-implemented method of claim 25 further comprising, determining that the user has performed a pinching gesture, and in response, displaying the first graphical representation in the window and not the second graphical representation.

* * * * *